United States Patent
Blanga

[11] Patent Number: 5,931,084
[45] Date of Patent: Aug. 3, 1999

[54] METHOD AND APPARATUS FOR SEARING AND COOKING FOOD PRODUCTS

[76] Inventor: Raphael Blanga, 58 Bryant Dr., Livingston, N.J. 07039

[21] Appl. No.: 09/002,893

[22] Filed: Jan. 5, 1998

[51] Int. Cl.⁶ .................. A47J 37/08; A23L 3/00
[52] U.S. Cl. ........................... 99/388; 99/443 C
[58] Field of Search .............. 99/388, 386, 443 C

[56] References Cited

U.S. PATENT DOCUMENTS

| | | | |
|---|---|---|---|
| Re. 34,671 | 7/1994 | Long | 99/386 |
| 3,721,178 | 3/1973 | Szabrak et al. | 99/386 |
| 4,167,585 | 9/1979 | Caridis et al. | 426/233 |
| 4,297,942 | 11/1981 | Benson et al. | 99/386 |
| 4,384,006 | 5/1983 | Wallick | 426/383 |
| 4,433,621 | 2/1984 | Van Wyk et al. | 101/11 |
| 4,610,886 | 9/1986 | Buller-Colthurst | 426/233 |
| 4,655,146 | 4/1987 | Lemelson | 110/346 |
| 4,667,589 | 5/1987 | Bishop | 99/386 |
| 4,686,894 | 8/1987 | Long | 99/386 |
| 4,717,572 | 1/1988 | Buller-Colthurst | 426/233 |
| 4,986,174 | 1/1991 | Gongwer | 99/345 |
| 5,044,264 | 9/1991 | Forney | 99/349 |
| 5,094,155 | 3/1992 | Long | 99/386 |
| 5,179,265 | 1/1993 | Sheridan et al. | 219/497 |
| 5,197,375 | 3/1993 | Rosenbrock et al. | 99/328 |
| 5,253,564 | 10/1993 | Rosenbrock et al. | 99/328 |
| 5,392,696 | 2/1995 | Navarro et al. | 99/339 |
| 5,392,698 | 2/1995 | Sprecher et al. | 99/443 C |
| 5,458,051 | 10/1995 | Alden et al. | 99/349 |
| 5,512,312 | 4/1996 | Forney et al. | 426/523 |
| 5,615,606 | 4/1997 | Vos | 99/352 |
| 5,666,876 | 9/1997 | Vos | 99/443 C |

*Primary Examiner*—David Lacey
*Assistant Examiner*—Drew Becker
*Attorney, Agent, or Firm*—Morgan & Finnegan, L.L.P.

[57] ABSTRACT

A method and apparatus for efficiently making grill marks on both sides of a plurality of food products while simultaneously cooking the plurality of food products. The food products may include hamburgers, chicken breast, soy products, etc. A continuous grilling belt transports products along a path of conveyance in which heat, speed, and other variables are controlled. The product is automatically turned over during the conveyance period. The food product may be produced in industrial quantities.

32 Claims, 11 Drawing Sheets

METHOD AND APPARATUS FOR SEARING AND COOKING FOOD PRODUCTS

BACKGROUND OF THE INVENTION

The present invention relates to the field of cooking food products and, more specifically, an apparatus and method that will be used in an industrial process.

Food products are often pictorially advertised, in photographs and television, as having grill stripes or score marks on the surface. In fact, although tremendously appealing to the eye, it is very difficult to achieve these marks in a commercial manner. This is due to the fact that the cooking area of the grill or barbecue therefore is uniformly hot. Therefore, the steel members forming the grill marks are not necessarily much hotter than the surrounding air space.

SUMMARY OF THE INVENTION

An aspect of the preferred embodiment includes a grilling machine which scores a plurality of food products comprising: a burner for supplying a thermal energy to the plurality of food products; a grill conveyor assembly having a belt which has an upper and a lower portion; and wherein said lower portion passes through a fire from said burner and said upper portion scores the plurality of food products.

Another aspect of the preferred embodiment includes an apparatus comprising: a first grilling belt which scores a first side of a plurality of food products; a second grilling belt which scores a second side of the plurality of food products; wherein the second grilling belt is located in a linear position relative to the first grilling belt.

Another aspect of the preferred embodiment includes an apparatus which simultaneously cooks and scores a plurality of food products comprising: a first grilling machine comprising: a first burner for supplying thermal energy to said plurality of food products; a first grill conveyor assembly having a belt which has a first upper and a first lower portion; said first lower portion passes through a fire from said first burner and said first upper portion cooks and scores the food product on a first side; a second grilling machine comprising: a second burner for supplying thermal energy to the plurality of food products; a second grill conveyor assembly having a belt which has a second upper and a second lower portion; and the second lower portion passes through a fire from the second burner and the second upper portion scores the food product on a second side.

Another aspect of the preferred embodiment includes an apparatus comprising: a first means for simultaneously cooking and scoring a food product; a second means for simultaneously cooking and scoring a food product; wherein said second means is located in a linear position relative to the first means.

Another aspect of the preferred embodiment includes a method comprising: conveying a plurality of food products through a first grilling machine; simultaneously cooking and scoring said plurality of food products with a first side down; turning said plurality of food products over onto their second sides as the food product travels from the first grilling machine to a second grilling machine located in a linear relationship to the first grilling machine; conveying said plurality of food products through said second grilling machine; simultaneously cooking and scoring said plurality of food products with a second side down.

DETAILED DESCRIPTION OF THE PREFERRED EMBODIMENT

FIGS. 1–11 of the drawings depict the preferred embodiment of the present invention for purposes of illustration only. One skilled in the art will readily recognize from the following discussion that alternative embodiments of the structures and methods illustrated herein may be employed without departing from the principles of the invention described herein.

Currently, in industrial food processing plants, due to the concern with contamination, the United States Department of Agriculture (U.S.D.A.) does not allow use of the same instrument for raw and cooked products. This regulation has forced many manufacturers to buy stationary grilling machines and transfer product at different stages of cooking to separate machines. This creates a non-uniform product with uneven grill marks due to the movement of the product while cooking. This method of cooking depends on the instinct of the person who is grilling which in turn creates overcooking and uneven cooking which also creates a loss in yield of product.

Figure 1:
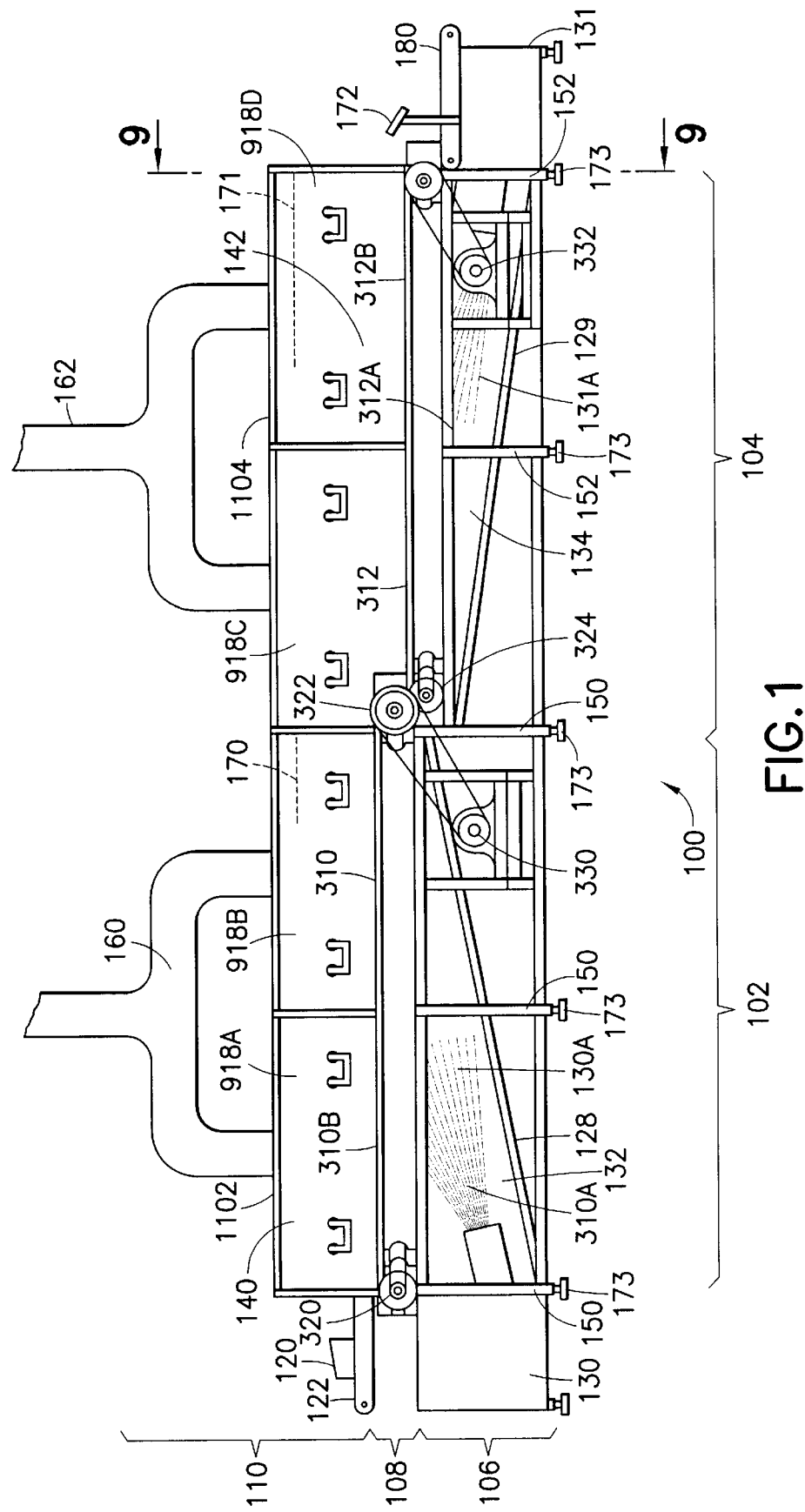
FIG. 1 illustrates a utility or backside elevational view of the preferred embodiment with lower assembly insulated panels removed.

The grilling machines 102 and 104 of the preferred embodiment as shown in FIG. 1 have eliminated the above deficiencies by controlling the heat through self-modulating gas burners, by controlling the speed of the conveyor belt which transports the food product through the grilling machines, and by only moving the food product or plurality of food products once to flip them over during processing so the food product stays in the same spot on the grilling (or grill) ribs while it is carried through the first and second cooking tunnels 140, 142.

FIG. 1 illustrates a utility or backside elevational view of the preferred embodiment with insulated panels removed in accordance with a preferred embodiment of the present invention. Reference Numerals 102 and 104 show industrial high capacity continuous grilling machines. The grilling machines may be used either alone or in combination depending on if a grill mark is desired on only one side (one grilling machine) or both sides (two grilling machines) of the food product. The grilling machines 102 and 104 have the same exact structure except that the lower assembly of grilling machine 104 has been set at a lower height. The second grilling machine 104 is located in a linear position relative to the first grilling machine 102 as shown in FIG. 1. Reference numeral 120 represents a food product or plurality of food products which may include hamburgers, chicken breasts, soy products, imitation meat, meat, fish, vegetables, and any other type of food products. The food product 120 may be cooked in industrial or commercial quantities and at a rate exceeding 1,000 pounds (lbs.) per hour. Therefore, although only a single food product 120 is being shown in FIG. 1 it is to be understood that a plurality of food products may be continually fed through the combined grilling machines 100.

The food product 120 is initially conveyed to the infeed side of the first grilling machine 102 on a conveying device 122. The first grilling machine 102 is made up of a first lower assembly 106, a first conveyor assembly 108, and a first upper assembly 110. The second grilling machine 104 is made up a second lower assembly 107, a second conveyor assembly 109, and a second upper assembly 111.

Figure 7:
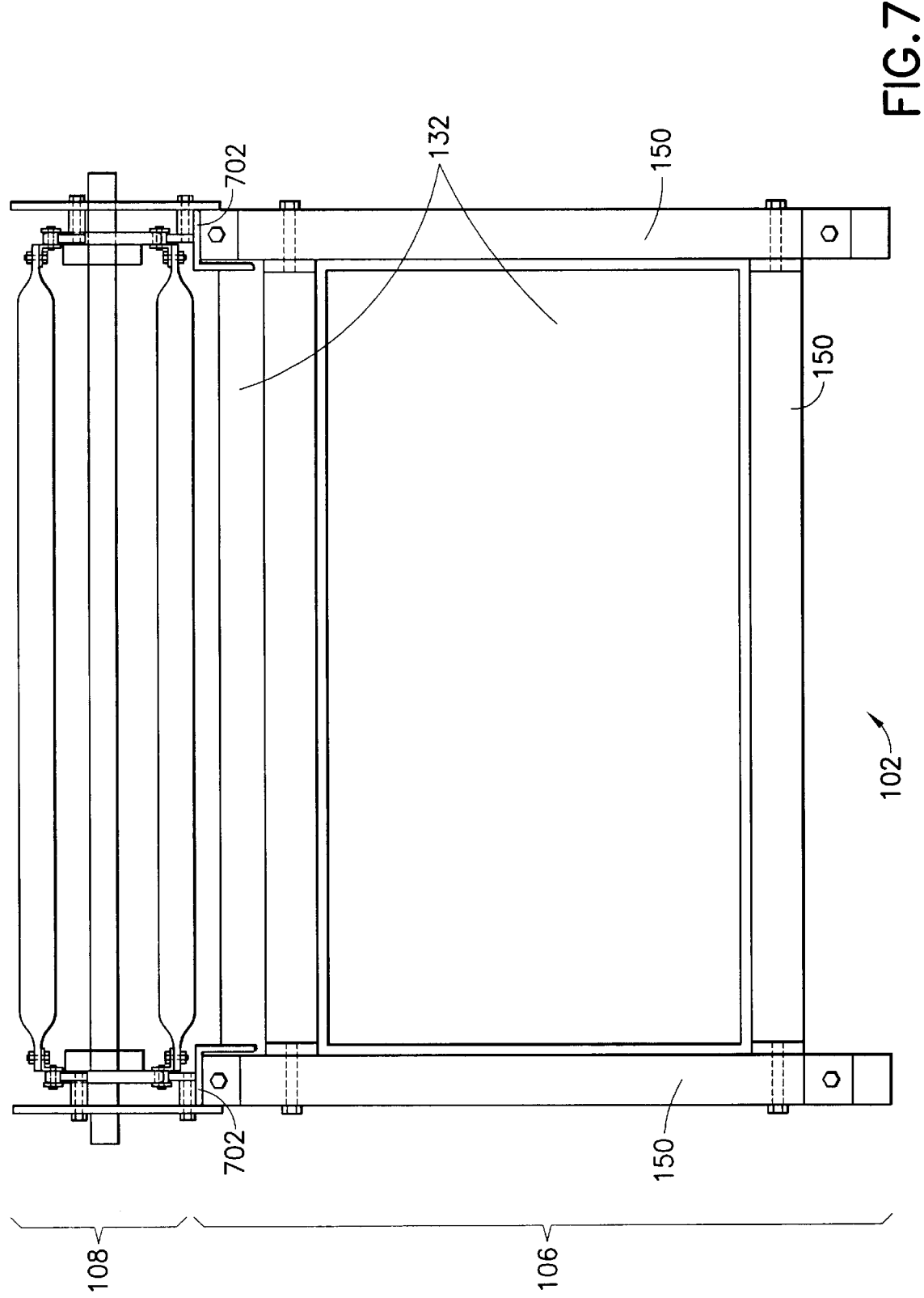
FIG. 7 shows a side or outfeed view of the first lower conveyor assembly resting on the first lower assembly with a first fire chamber in place.

The first lower assembly 106 includes a first powerful gas burner 130 spraying flames into first fire chamber 132. The first fire chamber 132 contains a damper 128 which rests on the lower frame 150 and which directs the flames in an upward direction. The second lower assembly 107 includes a second powerful gas burner 131 spraying flames into second fire chamber 134. The second fire chamber 134 contains a damper 129 which rests on the lower frame 152 and directs the flames in an upward direction. The first and second fire chambers 132 and 134 are spaced above the bottom insulated panel (not shown) which is attached to the frames 150 and 152 so as to create an air insulation layer between the fire chamber and the bottom insulated panel and provide for double insulation. The use of separate gas burners allows the first grilling machine 102 to be run at a different temperature than the second grilling machine 104. The first and second fire chambers 132 and 134 are each made up of a fire chamber frame (1002 in FIG. 10). The first and second fire chambers 132, 134 rest inside the first and second lower frames 150 and 152. The first and second fire chambers are not attached to the lower frames 150 and 152, but are detachable modules. The first and second fire chambers hang by hooks (702 as shown in FIG. 7) which extend the length of each of the grilling machines on the first and second lower frames 150 and 152. Because the first and second fire chambers are not attached to the lower frame they are able to expand as the temperature in the first and second fire chambers increase.

Figure 8:
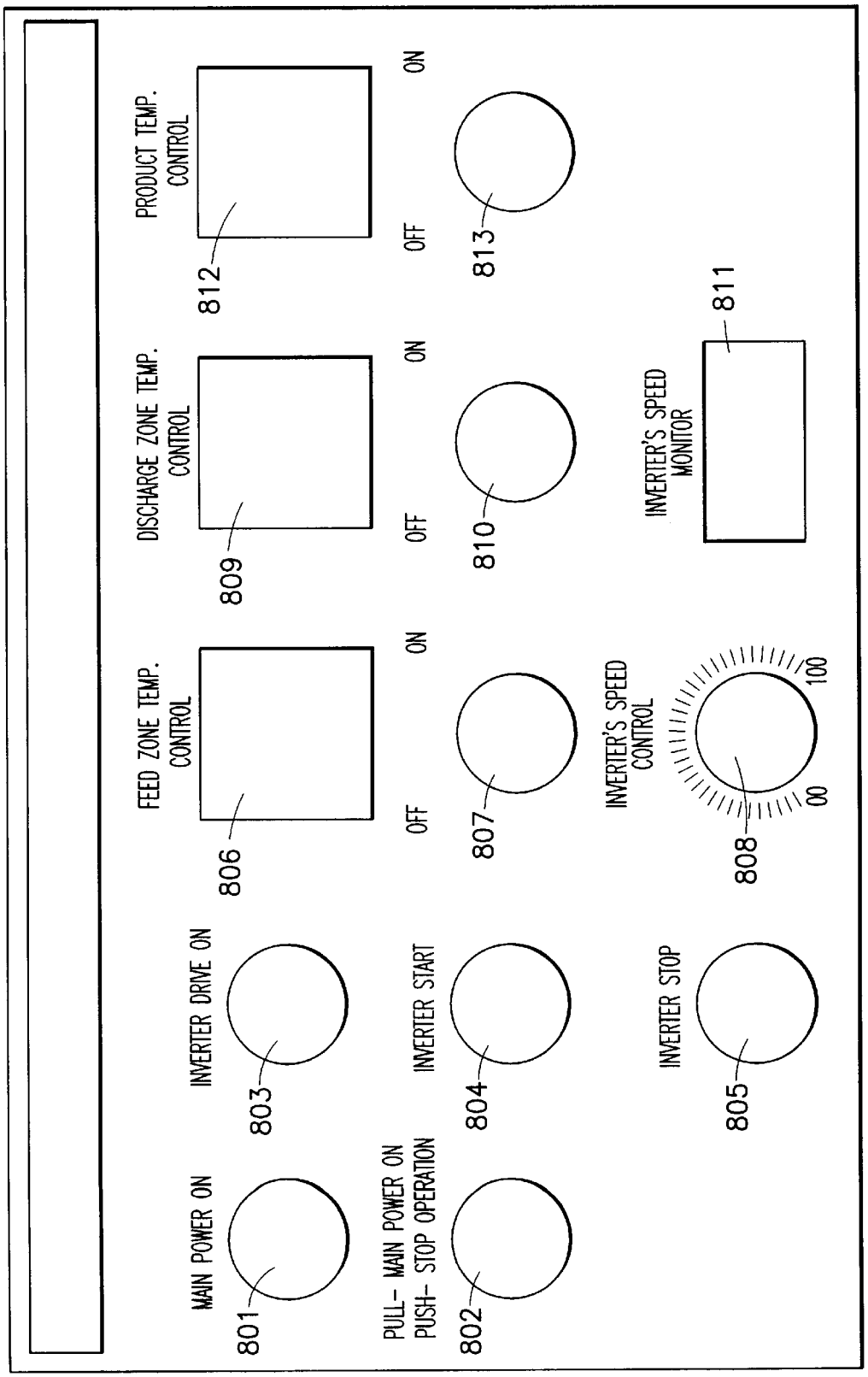
FIG. 8 illustrates an elevational view of the control panel in accordance with the preferred embodiment.

The burners 130 and 131 are controlled by a temperature controller (reference numeral 800 which is shown in FIG. 8) which is modulating a gas valve 972 (shown in FIG. 9) and creating uniform heat inside first and second cooking tunnels 140 and 142. The burners 130 and 131 do not create a direct flame on the food product 120, but instead are directed at first and second conveyor assemblies 108 and 109. The gas train and control components of the burners 130 and 131 are completely sealed. (Note that ashes may be allowed to build up in the first and second fire chambers which would create a smokey or barbecue flavor effect on the food product as the ashes are burned and burned again).

The first and second lower assemblies also include supports 173 and 175 which allow for the adjustment of the height of each of the grilling machines 102 and 104.

The first and second lower assemblies 106 and 107 further include first and second electric motors and gear reducers 330 and 332. The use of two separate driving devices allows the first grilling conveyor belt 310 to run at a different speed than the second grilling conveyor belt 312. Therefore, the cooking speeds of the food product 120 may be controlled with a great degree of accuracy.

The first lower assembly 106 further includes a stainless steel frame 150 which provides support for the first conveyor assembly 108 and first upper assembly 110 of the grilling machine 100. The second lower assembly 107 further includes stainless steel frame 152 which provides support for the first conveyor assembly 108 and first upper assembly 110 of the grilling machine 100. The stainless steel frames 150 and 152 may be made from 2"×2" stainless steel tubing.

The first conveyor assembly 108 includes a first grill (or grilling) belt 310 and the second conveyor assembly includes a second grill (or grilling) conveyor or belt 312. The first grilling belt 310 includes a first lower portion 310A and a first upper portion 310B. The second grilling belt 312 includes a second lower portion 312A and a second upper portion 312B. The simultaneous cooking and scoring of the food product occurs on the first and second upper portions 310B, 312B. First and second burners 130 and 131 are located in fire chambers 132 and 134 which contain dampers to spread the heat evenly.

Figure 3:
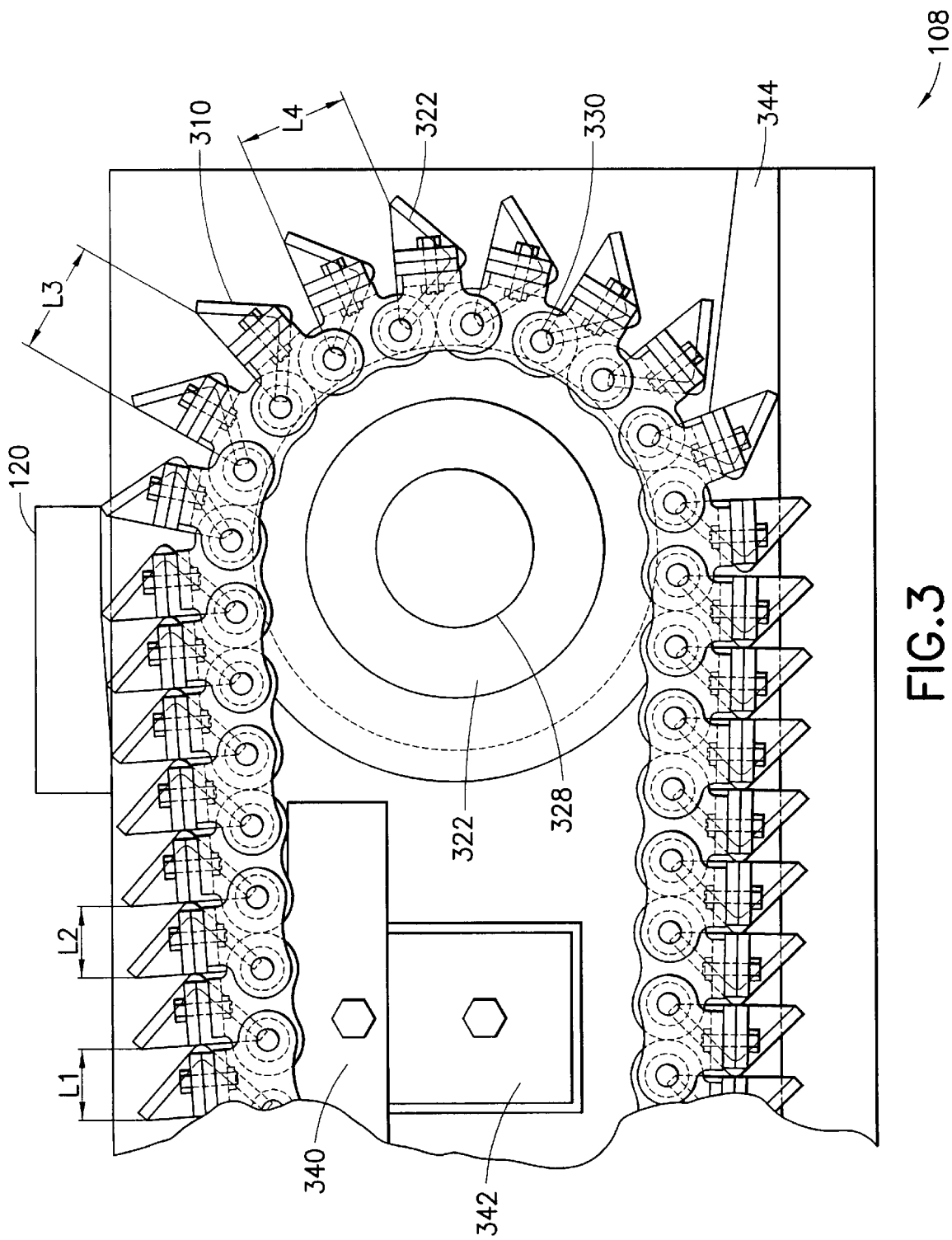
FIG. 3 illustrates a fragmentary, enlarged front or drive side elevational view of the first grill conveyor assembly in accordance with the preferred embodiment.

The first and second burners 130 and 131 are positioned so that no direct flame is directed at the food product 120 to keep the yield high and not dry out the food product 120. The burners 130 and 131 shoot flames through the fire chambers 132 and 134 to heat the first and second lower portions 310A, 312A of the grilling belts. The grilling belts 310 and 312 are each made up of a plurality of grilling ribs 310 (as shown in FIG. 3) which are travelling through the direct flames 130A, 131A of the burners 130, 131. The grilling ribs may reach temperatures of approximately 600 to 1,000 degrees Farenheit. The grilling ribs 310 absorb the heat of the direct flames 130A, 131A which will simultaneously cook and score the food product 120 when the grilling ribs 310 are in the first and second upper portions 310B, 312B of the grill conveyors 310, 312. The first and second conveyor lower portions 310A, 312A protect the food product 120 from the direct flame as it is being conveyed, cooked, and scored on the first and second conveyor upper portions 310B, 312B so that at no time does a direct flame have to come into contact with the food product.

The first cooking tunnel 140 extends above the first grilling conveyor belt 310 and the second cooking tunnel 142 extends above the second grilling conveyor belt 312. The first and second cooking tunnels 140 and 142 are insulated tunnels formed by 1.5×1.5 inch stainless steel tubing (1102 in FIG. 11) and removable insulated two inch thick panels (918A–D shown in FIG. 1 and FIG. 11) which allow for access to the machine while cleaning. The grilling ribs 310 and the cooking tunnels 140 and 142 allow the food products to be cooked at temperatures in the range of approximately 350 to 400 degrees Farenheit.

Grilling belt 310 of grilling machine 102 is set at a greater height using supports 173 than grilling belt 312 of grilling machine 104 in the preferred embodiment so that the food product 120 which has a first side down in the first section 102 will flip and then fall onto the second grilling belt 312 so that grilling marks may be achieved on the second side of the food product 120 as it travels through the second grilling machine 104.

The first conveyor assembly 108 further includes conveyor sprockets 320 and 322 which turn the first grilling conveyor belt 310. The second conveyor assembly 109 further includes conveyor sprockets 324 and 326 which turn the second grilling conveyor belt 312.

Figure 9:
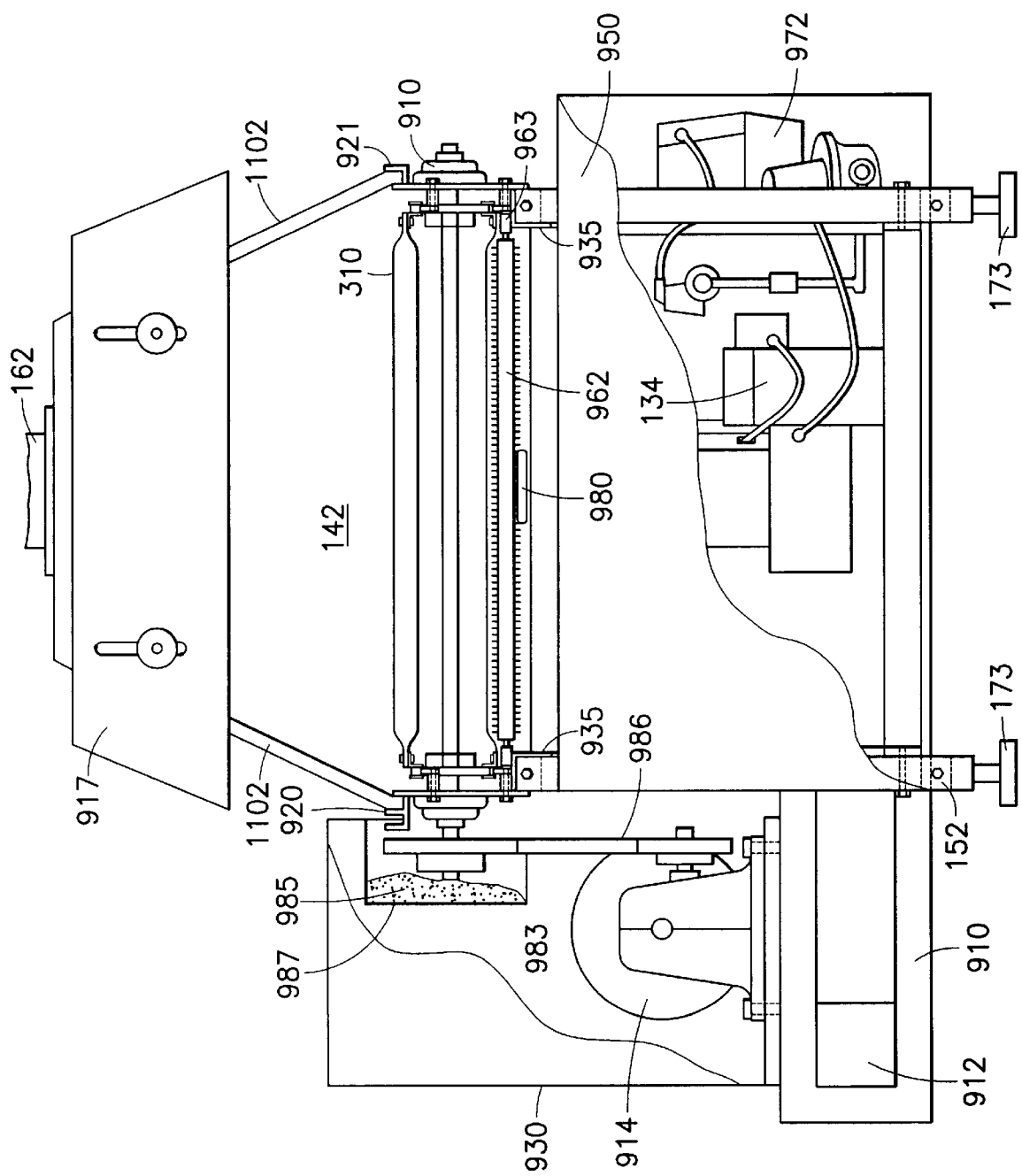
FIG. 9 illustrates a side or outfeed elevational view of the preferred embodiment taken along line Z—Z in FIG. 1.
Figure 11:
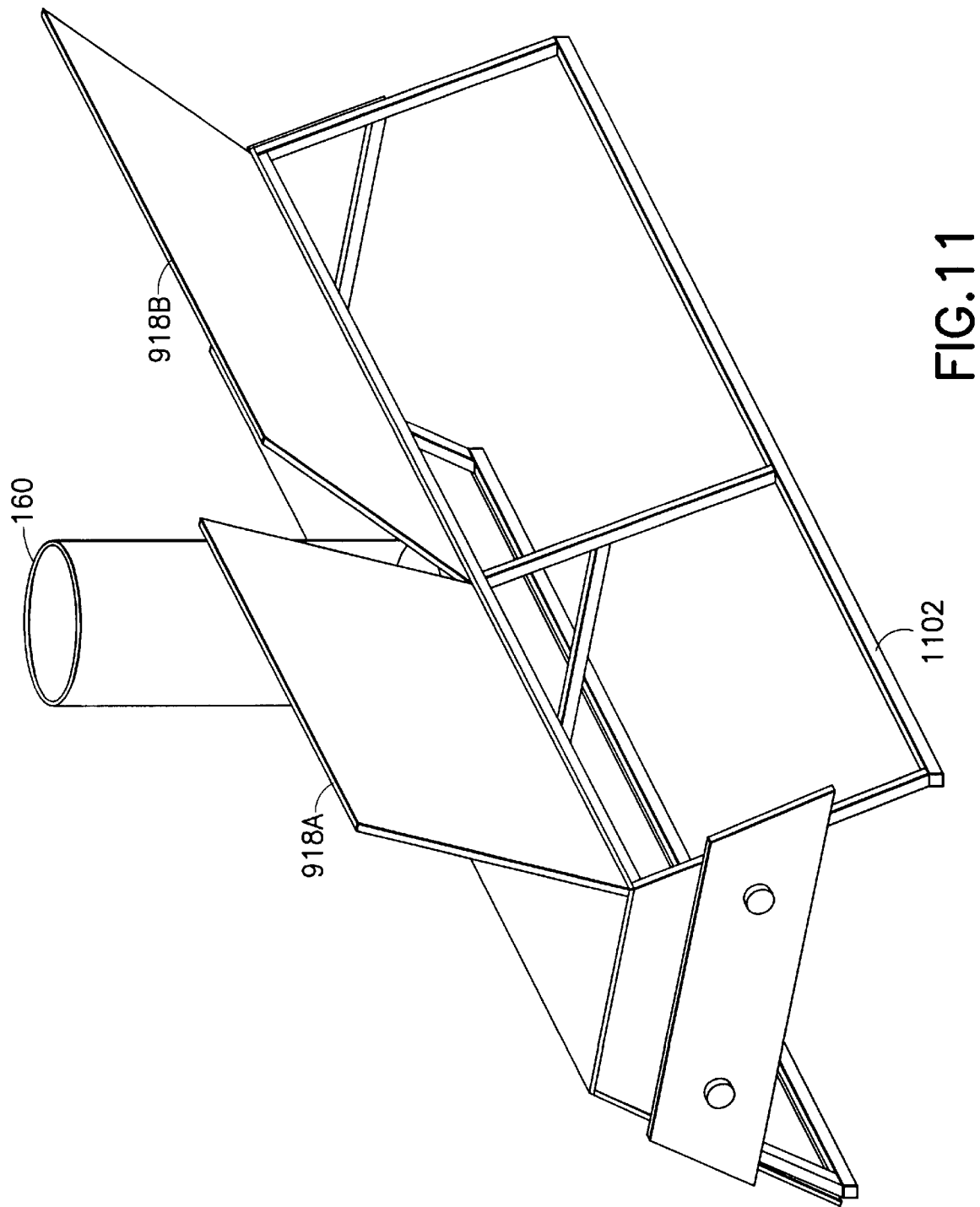
FIG. 11 illustrates a perspective view of the upper assembly with panels in an upright position and having an adjustable panel.

As discussed above, the first upper assembly 110 includes panels 918A and 918B which allow access for cleaning to the cooking tunnel 140 as shown in FIGS. 1 and 11. The first upper assembly further includes a first duct exhaust 160 containing a damper (not shown) which removes fumes from the cooking tunnel 140. The second upper assembly 111 includes panels 918C and 918D which allow access for cleaning to the cooking tunnel 142. The second upper assembly 111 further includes a second duct exhaust 162 which removes fumes from the cooking tunnel 142. The panels 918A–D are mounted on stainless steel struts 1102 which rest in U-shaped channels 920 located in the conveyor assemblies as shown in FIG. 9. The housing cover 930 may also rest in the U-shaped channels located on the conveyor assemblies.

Reference numerals 170 and 171 represent steam nozzle sprayers for adding humidity (i.e., controlled live steam) during cooking which are controlled by a steam valve (not shown) and wet bulb sensor (not shown). The steam nozzle sprayers may extend across the path of the food product. The ability to add humidity to the cooking tunnels 140 and 142 prevents the drying out of the food product and leads to an increased product yield.

Reference numeral 172 represents an infra-red sensor for checking temperature of the finished food product 120 and triggering an alarm if the product is undercooked. If the alarm is sounded the operator will be signalled to increase the set up temperature of the grilling machine. Due to an ability to control heat and speed, in an alternative embodiment, the grilling machine 100 may be used to only create grill marks on uncooked food that will later be cooked in an oven or fully cooked.

Reference numeral 180 represents an outfeed conveyor device for delivering the finished food product 120.

Figure 2:
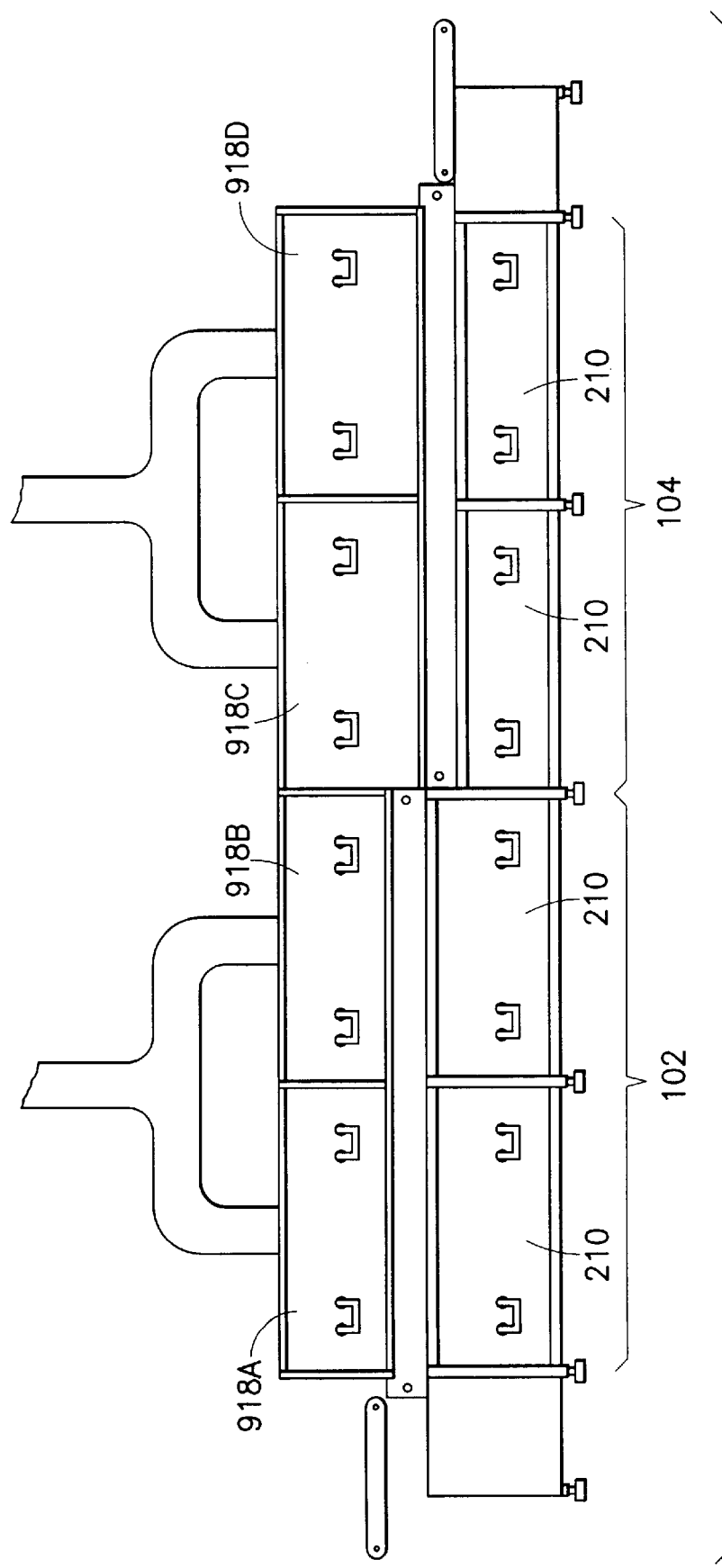
FIG. 2 illustrates a front elevational view of the preferred embodiment with insulated panels in place.

FIG. 2 illustrates a front elevational view of the preferred embodiment with insulated panels 210 in place.

FIG. 3 illustrates a fragmentary, enlarged front elevational view of the first grill conveyor assembly 108 in accordance with the preferred embodiment. The food product 120 is travelling on the grilling belt 310 as it nears roller or sprocket 322 right before the food product falls onto the lower positioned second grilling conveyor 312. A shaft 328 drives the sprocket 322. The first grilling conveyor 310 is made up of a chain 330 and grill ribs or links 332. The chain 330 may be A-1 stainless steel #60 chain and the grill ribs 332 may be made of 1.5 inch by 1.5 inch stainless steel angles. The upper portion of the grilling belt 310 is supported by an upper chain guide 340 which travels over a stainless steel tubing 342 which holds both sides of the grilling belt 310. The lower portion of the grilling belt 310 rides on a lower chain guide 344. A screw (not shown) may be used to adjust the tension in the chain.

The distance between links 332 when they are between the rollers in a first link position is shown by L1 and may be approximately 0.66 inches. The distance between links 332 when they are nearing roller 322 in a second link position is shown by L2 and may be approximately 0.75 inches. The distance between links 332 when they are turning over the roller 322 in a third link position is shown by L3 may be approximately 1.16 inches. The distance between links 332 when they are turning over the roller 322 may be approximately 1.20 inches. As the distance between the links spread, the food product 120 is gradually losing the attachment to the grilling belt 310 and falls onto the second grilling belt 312. As the food product 120 falls, it turns over so that the second side may be grilled. Although the action of the ribs 332 is shown with respect to roller 322, the same type of movement will occur in grilling belt 312 as the food product 120 from grilling belt 312 to outfeed conveying device 180.

In an alternative embodiment, the distances L1, L2, L3, and L4 may be varied according to the pitch of the chain which is chosen.

Figure 4:
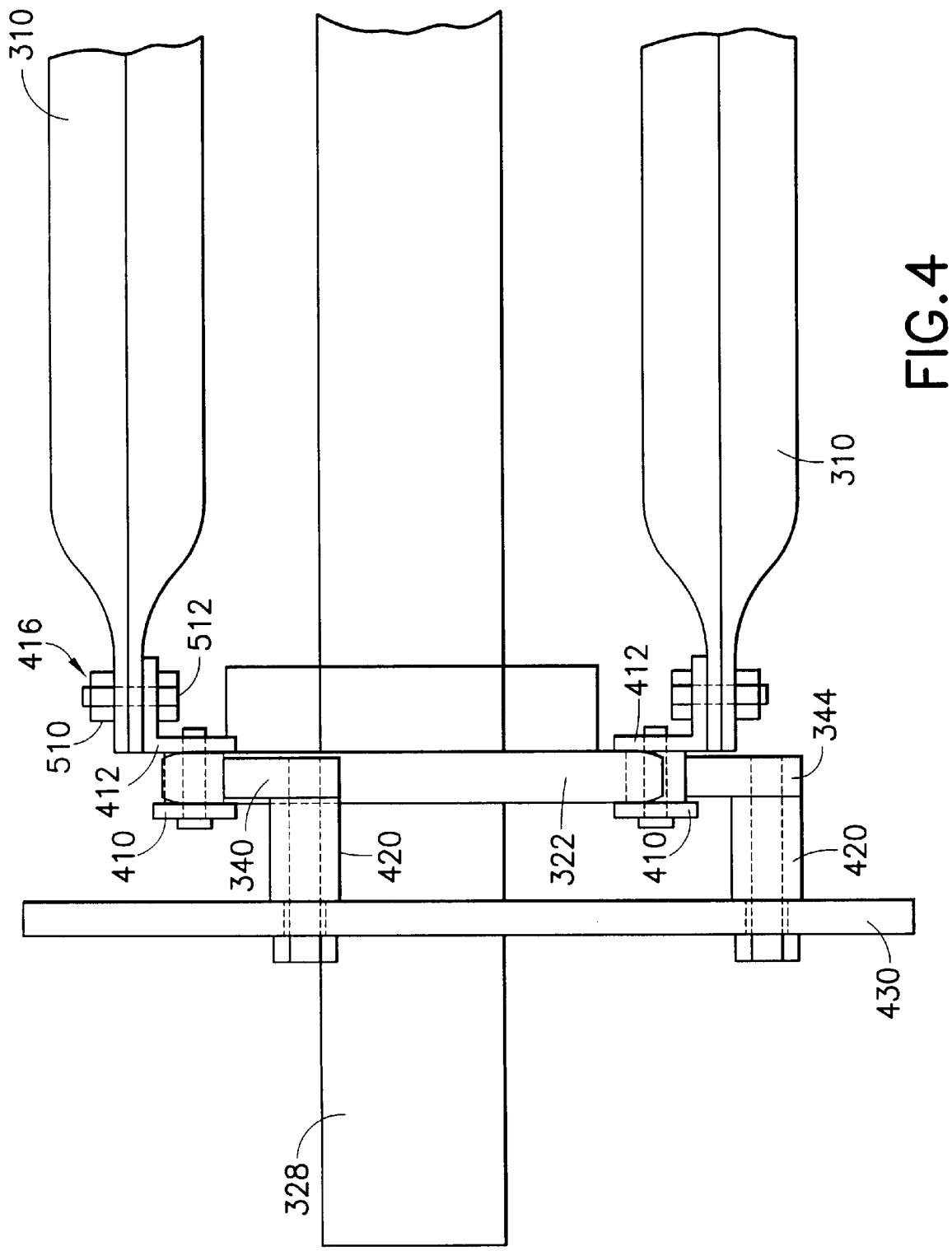
FIG. 4 shows an enlarged side or outfeed elevational view of the first grill conveyor assembly in accordance with the preferred embodiment.

FIG. 4 shows an enlarged side elevational view of the first grill conveyor assembly 108 in accordance with the preferred embodiment. Chain links 410 which are part of chain 330 contain attachment pieces 412 which are connected to ribs 310 through fastening devices 416. Each fastening device 416 is made up of a nut 510 and bolt 512. Spacers 420 keep the upper chain guide 340 and lower chain guide 344 an even distance from grilling conveyor wall 430.

Figure 5:
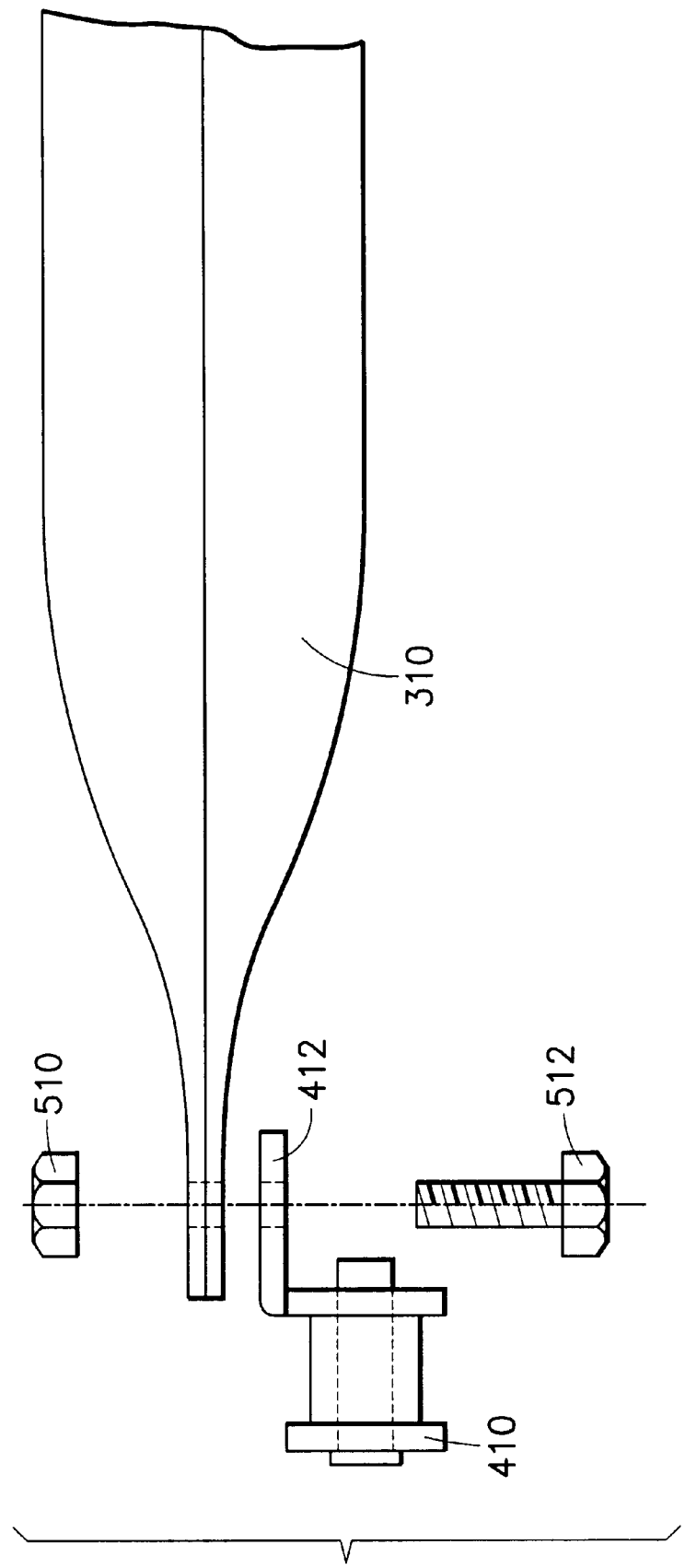
FIG. 5 shows an enlarged side elevational view of a grilling rib assembly attached to a chain in accordance with the preferred embodiment.

FIG. 5 shows an enlarged side elevational view of a grilling rib 310 in accordance with the preferred embodiment. The grilling rib 310 is attached to a chain link 412 as discussed above.

Figure 6:
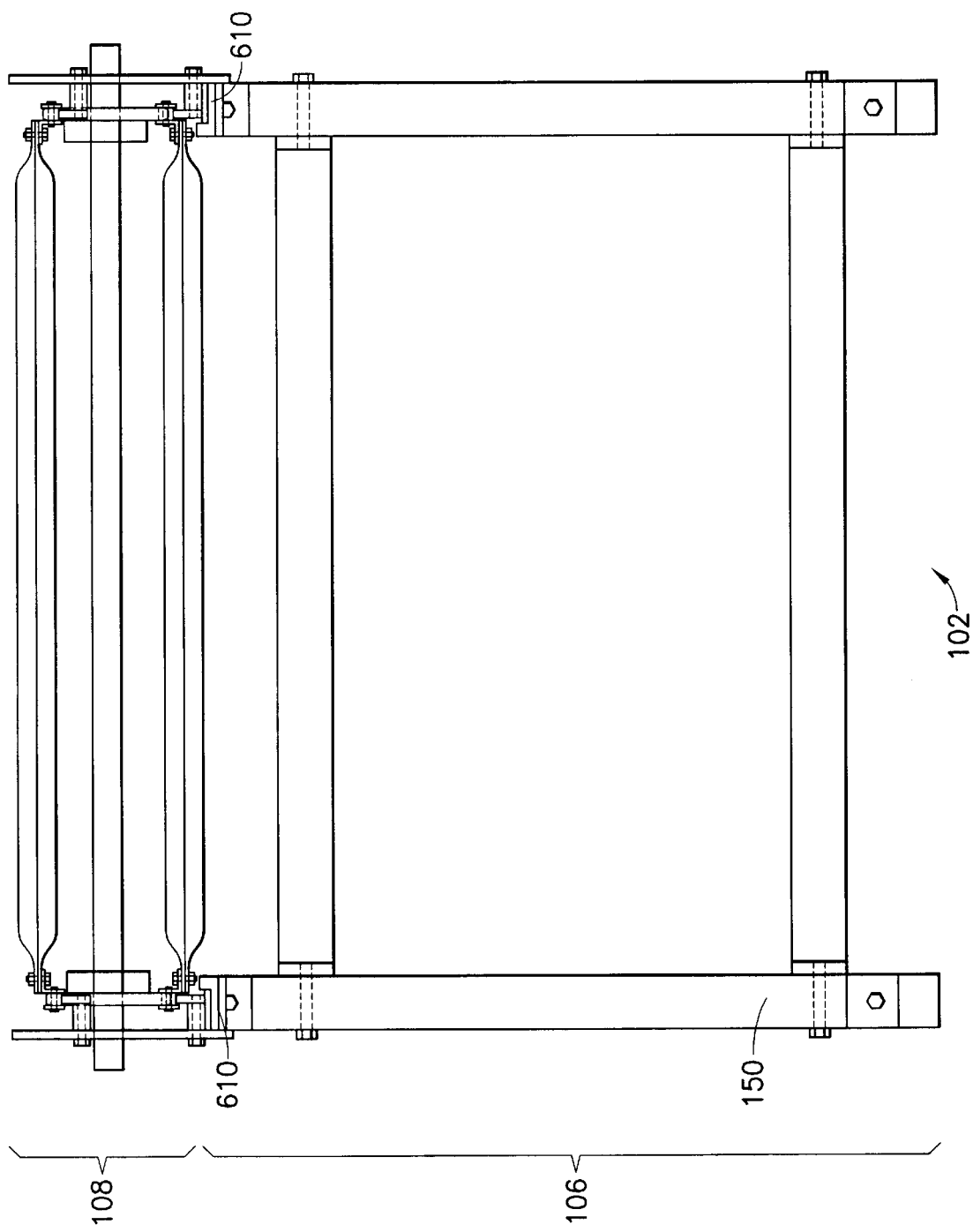
FIG. 6 shows a side or outfeed view of the first conveyor assembly resting on the first lower assembly section of the grilling machine.

FIG. 6 shows a side view of the first lower assembly 106 and first conveyor assembly 108 of the first section 102 of the grilling machine 100. The first conveyor assembly 108 is supported on the stainless steel frame 150 of the lower assembly 106. There is no attachment between the first conveyor assembly 108 and the lower assembly 106 to allow the conveyor to expand from the intense heat. The first conveyor assembly 108 sits completely free on the frame without bolts or being welded with approximately 0.25 inch clearance from both sides. The stoppers 610 prevent the first conveyor assembly 108 from sliding or moving on the frame. The stoppers 610 are located in front of the conveyor.

FIG. 7 shows an outfeed view of the first lower assembly 106 and first conveyor assembly 108 of the first section 102 of the grilling machine 100 highlighting the capability of the fire chamber 132 to expand. First fire chamber 132 rests on 2×2 inch angles 702 which rest freely on the stainless steel frame 150 with approximately 0.25 inch clearance on both sides to allow the first fire chamber 132 to expand.

FIG. 8 shows a control panel 800 of the griller 100. Reference numeral 801 is a light indicator for indicating power into the griller 100. Reference numeral 802 is an emergency stop button which cuts power when pressed and resets when pulled out. Reference numeral 803 is an inverter drive light which indicates when conveyor is running. Reference numeral 804 is the inverter start button which is pushed to start conveyor and reference numeral 805 is the inverter stop button which is pushed to stop conveyor. Reference numeral 806 is a feed zone temperature controller which shows set-up temperature and actual temperature at the same time and controls modulating gas valve which is controlling the heat in the feed zone. Reference numeral 807 is an on/off switch for powering the temperature in the feed zone controller. Reference numeral 808 is the inverter speed control dial which controls the speed of the conveyor. Reference numeral 809 is a discharge zone temperature controller which shows set up temperature and actual temperature simultaneously and controls modulating gas valve which is controlling heat in discharge zone. Reference numeral 810 is an on/off switch which is powering temperature controller in discharge zone. Reference numeral 811 is the inverter speed monitor which shows speed of belt. Reference numeral 812 is a product temperature controller which is coupled to sensor 172 to show temperature of finished product and set-up of temperature for finished product. Reference numeral 813 is a switch to power the product temperature control.

FIG. 9 shows a side view of the second section 104 of the preferred embodiment from line Z—Z in FIG. 1. As previously discussed, reference numeral 152 represents the frame of the grilling machine 104. Reference numeral 910 represents a drive mount. Reference numeral 912 represents a drive truft to store electric wires and prevent them from getting wet during a washdown period. Reference numeral 914 shows a drive which provides force to the conveyor belt. Reference numerals 935 show angles which support the conveyor assembly 109 on the lower frame 152.

As previously discussed, reference numeral 917 shows an adjustable panel which assists in keeping the steam from leaking out from the cooking tunnels. The panel 917 may be adjusted to the approximate height of the food product 120 which is being cooked. Reference numeral 950 represents a burner cover. Reference numeral 972 shows a self-modulating gas valve and gas train which controls burner 134. The self-modulating gas valve will automatically correct itself to adjust the temperature in the cooking tunnels (especially during a "walking" time period). As previously discussed, reference numerals 173 show supports or leveling legs for adjusting the height of the grilling machines. Reference numeral 980 represents a cleaner drawer plate which may be pulled out to be cleaned and washed down. Reference numeral 982 represents an expansion bearing which will let the shaft expand during the cooking period. Reference numeral 983 is a bearing which does not expand during heating. Reference numeral 962 shows a cleaning brush located above the cleaning drawer 963 which may prevent the build up of carbon on the edges of the grilling ribs.

FIG. 9 also shows a driving chain 986 for driving the grilling belt. The driving chain 986 is contained in a driving chain guard 985 which contains perforations 987 which allow the driving chain 986 to be sprayed and lubricated without having to remove the guard 985.

Figure 10:
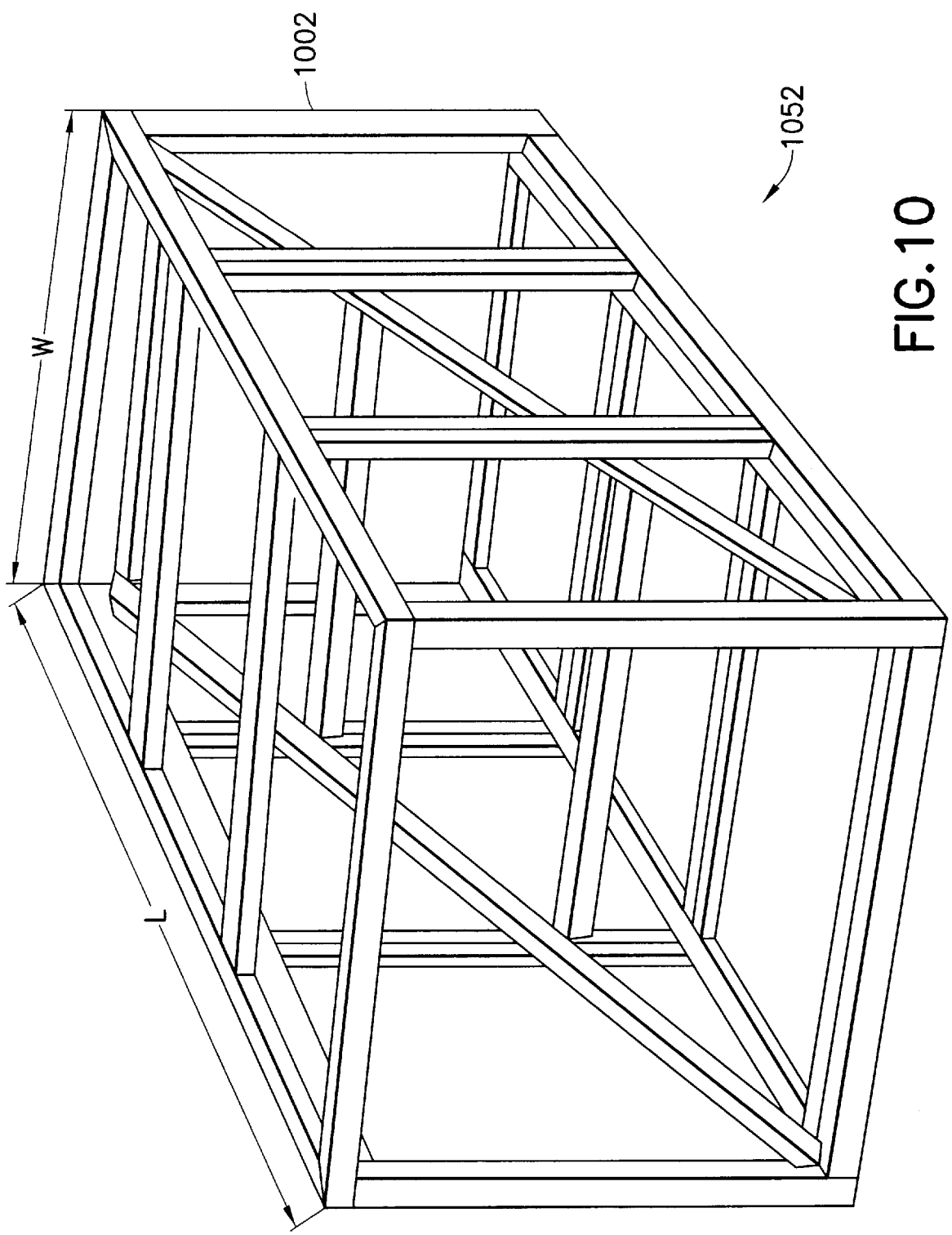
FIG. 10 illustrates a perspective view of the frame of a fire chamber of the preferred embodiment of FIG. 1.

FIG. 10 shows a perspective view of the fire chamber frame 1052 for the first grilling machine 102. The fire chamber frame 1052 rests inside the lower frame 152. Reference numeral L represents the length of the frame 1052 which may be approximately 69 inches and reference numeral W represents the width of the frame 1052 which may be approximately 31.0 inches. The fire chamber frame is furnished with 14 # (gauge) stainless steel panels that may be removed on one side of the fire chamber in order to allow access to the fire chamber for cleaning and maintenance.

The grilling machines 102 and 104 may also be equipped with a fire system which may be used to quickly extinguish fires which occur.

The method and operation of the grilling machines 102 and 104 will now be discussed. The food product 120 enters the grilling machine on the first conveyor belt 310 and is transported through the first cooking tunnel 140. As discussed above, the lower grilling ribs 310 have been absorbing heat from the hottest part of the fire in the fire chambers 132 and 134. Therefore, the grilling ribs 310 create grill marks in a very short time. During the rest of the passage through the first section 102 the marking and cooking on a first side of the food product 120 occurs. The food product 120 is being grilled on the first side by the heat from the ribs 310 and the ribs 310 are creating the grill marks on the food product 120 in a very short time. When the food product 120 reaches the end of the first section 102, the first side is done. If grill marks are desired on only one side of the food product, then the process will be completed at this point. The temperature of the grilling machine 102 may be set so that the food product is thoroughly cooked and scored one side.

However, if grill marks are desired on both sides of the food product, the process continues in the second grilling machine 104. The food product 120 turns over to a second, unscored side by falling from the higher level of the first conveyor belt 310 to the lower level of the second conveyor belt 312 in the second grilling machine 104. The food product 120 then travels through the second section 104 being grilled and marked on the second side. At the end of the second grilling machine 104, the food product travels out through the outfeed conveyor 180 which removes the product from the grilling machine 100.

Advantages of the preferred embodiment include a food product which has even grill marks on both sides of the products.

Another advantage of the preferred embodiment is that since it may made almost entirely of stainless steel so that it can be hosed down during cleaning.

Another advantage of the preferred embodiment is that electrical components are completely sealed in N.E.M.A. 4X type enclosures.

Another advantage of the preferred embodiment is that it will meet U.S.D.A. approval.

Another advantage of the preferred embodiment is that it may handle over 1000 pounds of food product per hour.

Another advantage of the preferred embodiment is that no direct flame to the product keeps the yield high and does not dry out the food product.

Another advantage of the preferred embodiment is that the lower assembly, conveyor assembly, and upper assembly are not attached and may therefore expand as is required by the intense heat.

The foregoing is to be understood as being in every respect illustrative and exemplary, but not restrictive, and the scope of the present invention disclosed herein is not to be determined from the Detailed Description, but rather from the claims as interpreted according to the full breadth permitted by the law. Therefore, it is to be understood that the embodiments shown and described herein are only illustrative of the principles of the present invention and that various modifications may be implemented by those skilled in the art without departing from the scope and spirit of the invention.

I claim:

1. A grilling machine which scores a plurality of food products comprising:
    a grill conveyor assembly having a belt which has an upper and a lower belt portion; and
    a burner for supplying a thermal energy to said grill conveyor assembly;
        wherein said lower belt portion is positioned in relation to said burner so that the lower belt portion is capable of passing through a flame from said burner and said lower belt portion is constructed and arranged to substantially provide a barrier to prevent said flame from passing therethrough.

2. The grilling machine of claim 1, wherein the belt includes a plurality of grilling ribs.

3. The grilling machine of claim 2, wherein the plurality of grilling ribs are made of stainless steel.

4. The grilling machine of claim 1, wherein
    the grilling machine includes a lower section, the grill conveyor assembly, and an upper section;
    the lower section includes the burner; and the upper section includes a hood which prevents the heat from escaping from said grilling machine.

5. The grilling machine of claim 2, wherein the grilling ribs are constructed so as to withstand temperatures in the approximate range of 600 to 1,000 degrees Farenheit.

6. The grilling machine of claim 1, wherein the grill conveyor assembly is constructed so that the flame does not contact the plurality of food products.

7. The grilling machine of claim 1, wherein the grill conveyor assembly is constructed so that the plurality of food products are not subject to pressure while cooking.

8. An apparatus comprising:
   a first grilling belt which scores a first side of a plurality of food products;
   a second grilling belt which scores a second side of the plurality of food products;
      wherein the second grilling belt is located in a linear position relative to the first grilling belt;
   a first burner;
      wherein said first grilling belt is positioned relative to said first burner such that the first grilling belt is capable of passing through a first flame from said first burner; and
   a second burner;
      wherein said second grilling belt is positioned relative to said second burner such that the second grilling belt is capable of passing through a second flame from said second burner.

9. The apparatus of claim 8, wherein the first grilling belt and second grilling belt move the plurality of food products in the same direction.

10. The apparatus of claim 8,
    wherein the first and second grilling belts include a plurality of grilling ribs.

11. The apparatus of claim 10,
    wherein the grilling ribs are constructed so as to withstand temperatures in the approximate range of 600 to 1,000 degrees Farenheit.

12. The apparatus of claim 8, comprising steam nozzle sprayers for adding humidity to the plurality of food products.

13. An apparatus which simultaneously cooks and scores a plurality of food products comprising:
    a first grilling machine comprising:
       a first burner for supplying a thermal energy to said plurality of food products;
       a first grill conveyor assembly having a first belt which has a first upper and a first lower portion;
          said first lower portion capable of passing over a first flame from said first burner and said first upper portion is capable of cooking and scoring the plurality of food products on a first side;
          wherein said first lower portion is positioned to provide a barrier to substantially prevent said first flame from passing therethrough;
    a second grilling machine comprising:
       a second burner for supplying thermal energy to said plurality of food products,
       a second grill conveyor assembly having a second belt which has a second upper and a second lower portion;
          said second lower portion capable, of passing over a second flame from said second burner and said second upper portion is capable of cooking and scoring the plurality of food products on a second side;
          wherein said second lower portion is positioned to provide a barrier to substantially prevent said second flame from passing therethrough; and
       wherein said second grilling machine is located in a linear position relative to the first grilling machine.

14. The apparatus of claim 13,
    wherein the first grill conveyor is located at a higher position than the second grill conveyor.

15. The apparatus of claim 13, further comprising a plurality of first and second grill ribs located in the first and second grill conveyors which are farther apart when the plurality of food products are separating from the first grill conveyor than when the plurality of food products are travelling in a horizontal position on the first and second grill conveyors.

16. The apparatus of claim 15, wherein the plurality of first grill ribs are approximately 0.75 inches apart when nearing a roller.

17. The apparatus of claim 13, comprising a first driving device operably connected to the first grill conveyor assembly; and a second driving device operably connected to the second grill conveyor assembly.

18. The apparatus of claim 13,
    wherein the first and second grill conveyor assemblies are substantially made of stainless steel.

19. The apparatus of claim 13, wherein the second grilling machine is located in a sequential position relative to the first grilling machine.

20. The apparatus of claim 13, wherein said first and second belts are made up of stainless steel ribs.

21. The apparatus of claim 13, wherein the first grilling machine comprises said first grill conveyor assembly and a frame.

22. The apparatus of claim 13, wherein the first and second grill conveyor assemblies are constructed so as to expand in comparison with first and second lower frames of the first and second grilling machines.

23. The apparatus of claim 13,
    wherein the first gill conveyor assembly is constructed so as to expand in comparison to a first lower frame of the first grilling machine; and the second grill conveyor assembly is constructed so as to expand in comparison to a second lower frame of the second grilling machine.

24. The apparatus of claim 15, wherein first and second grilling ribs of the first and second grill conveyors are constructed so as to withstand temperatures in the approximate range of 600 to 1,000 degrees Fahrenheit.

25. An apparatus which simultaneously cooks and scores a food product comprising:
    a first burner positioned to supply thermal energy to a food product;
    a first grill conveyor having a belt which has a first upper and a first lower portion;
       said first lower portion positioned to pass through a first flame from said first burner and said first upper portion capable of cooking and scoring the food product on a first side;
    a second burner positioned to supply thermal energy to the food product;
    a second grill conveyor having a belt which has a second upper and a second lower portion;
       said second lower portion positioned to pass through a second flame from said second burner and said second upper portion capable of cooking and scoring the food product on a second side;

wherein the first grill conveyor is located at a higher position than the second grill conveyor;

wherein the food product is flipped from the first side to the second side when travelling from the first grill conveyor to the second grill conveyor, and further comprising a plurality of first grill ribs located in the first grill conveyor which are farther apart when the food product is separating from the first grill conveyor than when the food product is travelling in a horizontal position on the first grill conveyor;

wherein the first and second grill conveyors are substantially made of stainless steel;

wherein the second grill conveyor is located in a linear position relative tot he first grill conveyor;

wherein said first and second grill conveyors are made up of stainless steel ribs;

wherein the food product does not come into contact with said first and second flames.

26. The grilling machine of claim 1 wherein said upper belt portion includes a plurality of grilling ribs having angles which are capable of scoring the plurality of food products.

27. The grilling machine of claim 1, wherein a fire chamber rests inside a lower frame of the grilling machine.

28. The grilling machine of claim 1, wherein a fire chamber is not attached to a lower frame of the grilling machine.

29. The grilling machine of claim 1, wherein the grill conveyor assembly sits freely on a frame of the grilling machine.

30. The grilling machine of claim 1, wherein components of the burner are completely sealed.

31. The grilling machine of claim 2, wherein the grilling ribs are constructed so as to withstand temperatures of between 600 to 1,000 degrees Farenheit.

32. The grilling machine of claim 1, further comprising:
insulated panels positioned to retain heat within the first grill conveyor assembly.

* * * * *